United States Patent
Kalhoff

(10) Patent No.: US 8,522,316 B2
(45) Date of Patent: Aug. 27, 2013

(54) CONNECTOR AND METHOD FOR PROVIDING ACCESS TO A DATA-PROCESSING NETWORK FOR A DATA-PROCESSING DEVICE

(75) Inventor: Johannes Kalhoff, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 959 days.

(21) Appl. No.: 12/261,353

(22) Filed: Oct. 30, 2008

(65) Prior Publication Data

US 2009/0119753 A1    May 7, 2009

(30) Foreign Application Priority Data

Nov. 1, 2007  (DE) .......................... 10 2007 052 523

(51) Int. Cl.
*H04L 9/32* (2006.01)

(52) U.S. Cl.
USPC ............................................... 726/4; 726/11

(58) Field of Classification Search
USPC ............... 726/9, 26, 27, 28, 29; 713/224, 713/201, 212, 213, 220, 223; 709/204, 201, 709/220, 227; 707/600, 607, 608, 609, 687, 707/821; 380/200, 201, 202, 293, 227
See application file for complete search history.

(56) References Cited

U.S. PATENT DOCUMENTS

| 2005/0108434 A1 | 5/2005 | Witchey |
| 2007/0022474 A1* | 1/2007 | Rowett et al. ................... 726/11 |
| 2008/0295259 A1* | 12/2008 | Ueda et al. ........................ 8/401 |

FOREIGN PATENT DOCUMENTS

| EP | 0 743 777 A2 | 11/1996 |
| EP | 1 336 915 A1 | 8/2003 |
| EP | 1 494 396 B1 | 1/2005 |

OTHER PUBLICATIONS

Gerhard Leitner, "German Application No. 10 2007 052 523.2 Office Action", Mar. 12, 2009, Publisher: Deutsches Patent-und Markenamt, Published in: DE.
R. Droms, "RFC 2131—Dynamic Host Configuration Protocol", Mar. 1997, pp. 145, vol. 46, Publisher: Bucknell University, Published in: US.
Franz Koebinger, "Die innere Sicherheit", Mar. 3, 2009, pp. 44-47, Publication No. XP002518038, Publisher: www.elektroniknet.de: URL:http://www.automation.siemens.com/donwload/internet/cache/3/1128965/pub/de/162_04_die_innere_sicherheit.pdf, Published in: Computer & Automation [online] Nr. 5, 2004.
Michael Nold, "European Office Action for International Applicaotin No. EP 08 01 8731", Jun. 4, 2009, Publisher: EPO, Published in: EP.
German Office Action, issued by the German Patent and Trademark Office, Aug. 11, 2008.

* cited by examiner

*Primary Examiner* — Jeffrey Pwu
*Assistant Examiner* — Nega Woldemariam
(74) *Attorney, Agent, or Firm* — Kaplan Breyer Schwarz & Ottesen, LLP

(57) ABSTRACT

The invention relates to a connector and also to a method for providing access to a data-processing network for a data-processing device, wherein an individual, decentralized, and secure access to a data-processing network is provided and wherein data exchange between the device and the network is possible or granted only when the device has at least one predefined identification feature. The invention further relates to a method for configuring the connector according to the invention.

22 Claims, 3 Drawing Sheets

Figure 1:
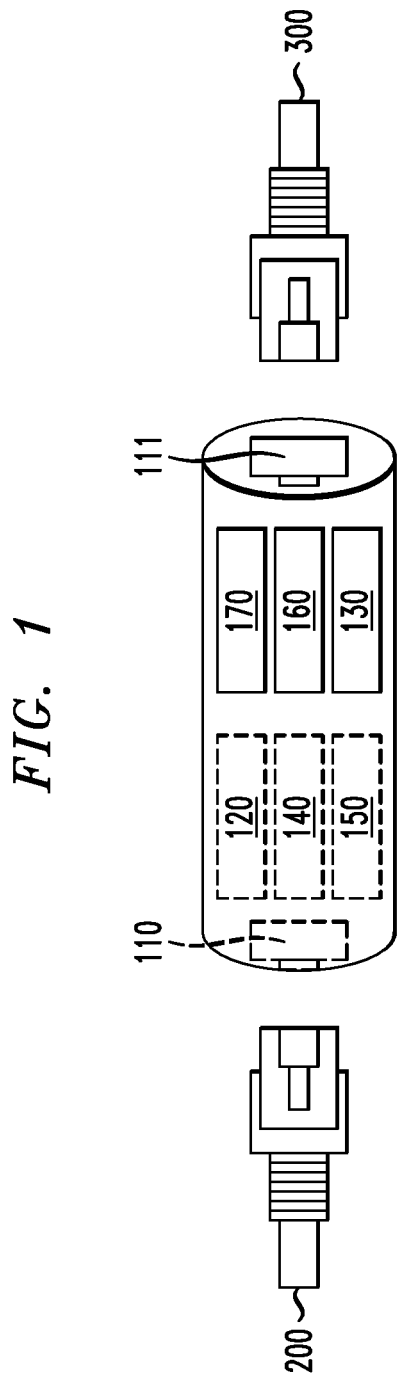

CONNECTOR AND METHOD FOR PROVIDING ACCESS TO A DATA-PROCESSING NETWORK FOR A DATA-PROCESSING DEVICE

The invention relates to a connector and also to a method for providing access to a data-processing network for a data-processing device. The invention further relates to a method for configuring the connector.

Data-processing networks with multimaster functionality, in particular, based on the Ethernet standard, have been used in the meantime in automated industrial production, for example, for networking field devices.

As a function of the protocols used in a network on the different layers of the OSI reference model of ISO, the devices connected to the network usually have several different types of identification features, such as, for example, a MAC or IP address or a host name. Here, for a problem-free data exchange between the devices, it is essential that the identification features have been allocated to the devices in a network in such a way that these features each appear only once in the network and thus unique identification and addressing of each individual device is possible. It is understood that according to perspective, a network can consist technically and/or organizationally of several sub-networks, network segments, or network regions, but each network region also represents, in turn, a network in itself.

In the field of automated industrial production, the individual identification features are usually allocated manually, wherein the identification features are stored on each device using remnant memory.

The protective mechanisms of a so-called firewall are based on these identification features. Such a firewall is usually a very complex device that is inserted at central connection points between networks with different confidence stages and is used for the protection of a network and the resources in the network, such as, for example, devices, services, or data from undesired accesses of devices from other networks. For this purpose, a firewall secures a central access point to a network in that it checks and possibly prevents at this point the data exchange primarily with reference to the identification features specified as the transmitter and destination of a data packet.

However, a firewall cannot protect a network and its resources from risks that can originate from a device, such as, for example, a service laptop that is connected, even if only temporarily, directly to this network itself, i.e., behind the firewall.

Thus, for example, there is the risk that the data exchange within a network protected by a firewall will be considerably disrupted or even stopped, because after connecting a device that was previously used in another network, now identical identification features can appear multiple times.

In the field of automated industrial production, a firewall is installed, for example, above a cell controller, in order to protect the entire cell behind the firewall.

For example, in an emergency situation if a defective device in such a cell is replaced by a similar device from another cell and the identification features stored on the device are not checked and changed, if need be, due to lack of time or carelessness, then there is the risk of the multiple appearance of the same identification features and thus of interference or disruption of the entire data exchange in this cell.

The same identification features can also appear multiple times if, for example, in the course of maintenance or repair work on a device connected to a network by a service technician, a mobile service laptop is temporarily connected to this network, without the service technician checking and, if need be, changing the identification features stored on the service laptop in advance.

Data exchange that is only limited or is no longer possible at all in a network or a cell in the field of automated industrial production has negative effects on the reaction time or availability of machines, system parts, or whole systems, which can lead to lower quality or to damage to the manufactured products. Furthermore, damage to the machines or systems, as well as stoppage of the production is also possible. In addition, in the worst case, danger to life and limb can also occur for machines or systems affected in this way.

One problem of the invention is to create a possibility for protecting a data-processing network that can indeed be protected by a firewall at a central connection or access point in a simple way from dangers that can originate from a data-processing device that is to be connected directly and in a decentralized way to the network itself, possibly while bypassing each central access point protected by a firewall, in particular, from the multiple appearance of the same identification features in the network.

The solution according to the invention of the problem named above is given by a connector and also two methods with the features of each independent claim.

Advantageous and/or preferred embodiments and refinements are the subject matter of each dependent claim.

A core concept of the invention consists in providing a mobile connector by means of which a data-processing device can be connected to a data-processing network at any point, wherein the connector protects the network in a simple way from dangers that could originate from the device with a careless but not malicious action.

Thus, according to the invention, there is a connector for providing an access to a data-processing network, in particular, to a multimaster-capable, Ethernet-based data-processing network in automated industrial production for a data-processing device to be connected to the network. For this purpose, two connection devices to which the device and the network are connected, respectively, are made available to this data-processing device. The connector is characterized in that it is mobile, i.e., it is not bound to a location and it is portable, and it is constructed for providing an individual, decentralized, and secure access to a data-processing network and also has available a processing unit. After the device is turned on, the processing unit is constructed to first test this device for at least one predefined identification feature and to connect the two connection devices to each other and to allow data exchange between the device and the network only after detecting at least one predefined identification feature according to at least one authorization feature allocated to this identification feature.

A method according to the invention for providing an access to a data-processing network for a data-processing device to be connected to the network, wherein an individual, decentralized, and secure access to the data-processing network is provided, comprises additional processing steps in addition to providing a connector according to the invention. For example, the connector according to the invention is connected at any point to the network and to the device. In addition, at least one feature identifying the device is read from the first data packet that was transmitted by the device. Furthermore, the identification feature that was read out is compared with at least one predefined identification feature. Only when a match is detected is data exchange allowed between the device and the network according to at least one authorization feature allocated to this identification feature.

A method according to the invention for configuring the connector according to the invention comprises, as processing steps, the defining of at least one unique identification feature for a device to be connected to the network and the allocation of at least one defined authorization feature to the at least one identification feature. Furthermore, these configuration data are then transmitted to the connector according to the invention.

Consequently, one essential advantage of the invention is to be seen in that, in a simple way, a data-processing device can be connected to the network at any point, wherein, through a correspondingly configured connector according to the invention and thus, also in an economical way, it is also flexibly guaranteed that, especially for a careless but not malicious action, the device has only identification features that do not appear again in the network, so that the network is protected from dangers that can occur for the double appearance of identical identification features.

Furthermore, in order to prevent a service technician from inadvertently transmitting, for example, from a service laptop that was connected to the network according to the invention, a command to an incorrect device or a command by broadcast to all of the devices in this network, according to a preferred embodiment, the processing unit of the connector is constructed to allow data exchange between the connected device and only at least one defined resource in the network that is defined with reference to at least one identification feature only after at least one predefined identification feature has been detected.

In another especially preferred embodiment, the processing unit of the connector is constructed to allow the transmission of only at least one defined command within the data exchange only when at least one predefined identification feature has been detected. Here, in a simple way it is guaranteed that a service technician could not inadvertently transmit, for example, from a service laptop connected to a network according to the invention, an incorrect command to a device in this network that could become considerably disrupted by an incorrect command.

As a function of the complexity of the identification features to be checked and/or the authorization features to be monitored specific to the application, both embodiments of the connector in which the processing unit comprises at least one shift register and at least one comparator and also embodiments in which the processing unit additionally or alternatively comprises a processor are provided.

In a practical way, the connector according to another embodiment has available a display device that is constructed to display the presence of at least one identification feature that is not defined in advance.

In another embodiment, the display device of the connector is further constructed to display at least one predefined identification feature, so that, for example, a service technician knows which of at least one identification feature he must assign to a mobile service laptop to be connected to a network, so that data exchange with the network is possible.

According to one advantageous implementation of the connector, the processing unit is constructed to block any further data exchange between a device and the network at least temporarily for repeated detection of attempted data exchange with at least one resource in the network and/or attempted transmission of at least one command starting from a device that is connected to the network and that does indeed have at least one predefined identification feature but to which no corresponding authorization feature is allocated.

In particular, the processing unit of the connector is constructed to process MAC and/or IP addresses and/or host names as identification features of data-processing devices.

Furthermore, in addition to an embodiment of the connector for the wired connection of a data-processing device to a network, another embodiment for the wireless connection of a device to a network is provided, wherein the connection device is constructed in a correspondingly suitable way.

According to another embodiment of the connector, an interface, in particular, a USB interface, is provided by means of which the required operating voltage can be provided from an internal or external current source connected directly or from an external current source connected indirectly, in particular, to a data-processing device.

Preferably, it is further provided that the connector comprises a memory in which at least one predefined identification feature and also at least one authorization feature allocated to the identification feature can be stored as a function of which the processing unit of the connector allows data exchange.

Preferably, the connector further comprises a receive device for receiving predefined identification features and authorization features that are allocated to the identification features and that are transmitted in the course of configuring the connector from an external device, wherein the receive device can be connected to the memory, the one connection device, and/or the interface.

Instead of or also in addition to the receive device, the connector comprises, in another embodiment, an input device for the input of predefined identification features and the authorization features allocated to the identification features, wherein the input device is preferably connected to the memory.

These and other features, as well as other advantages accompanying these features, emerge from the following, more detailed description of a preferred embodiment with reference to the accompanying drawings.

Shown in the drawings are:

FIG. 1 is an example, simplified diagram of the connector according to the invention for supplying a decentralized and individually secured access to a data-processing network for a data-processing device to be connected to the network.

Figure 2A:
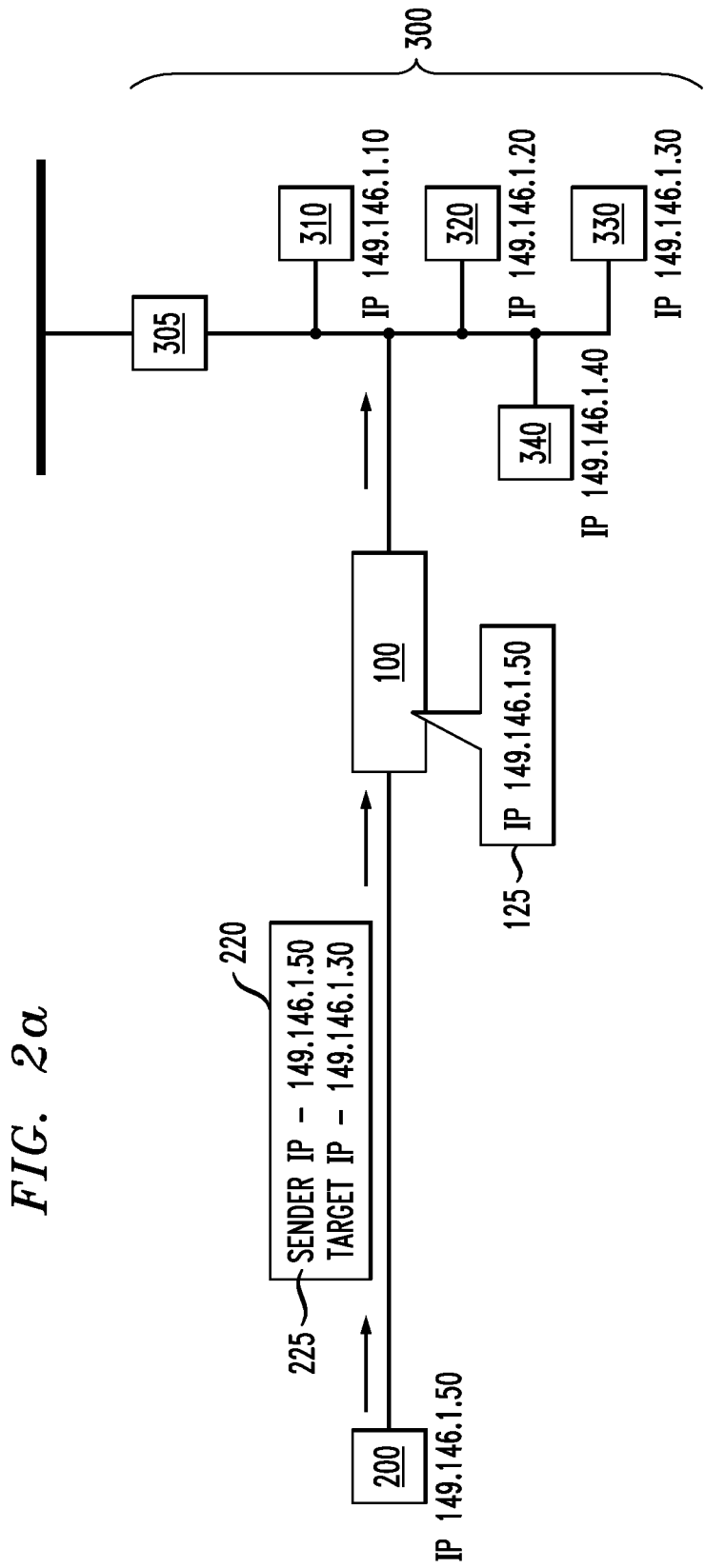
Figure 2B:
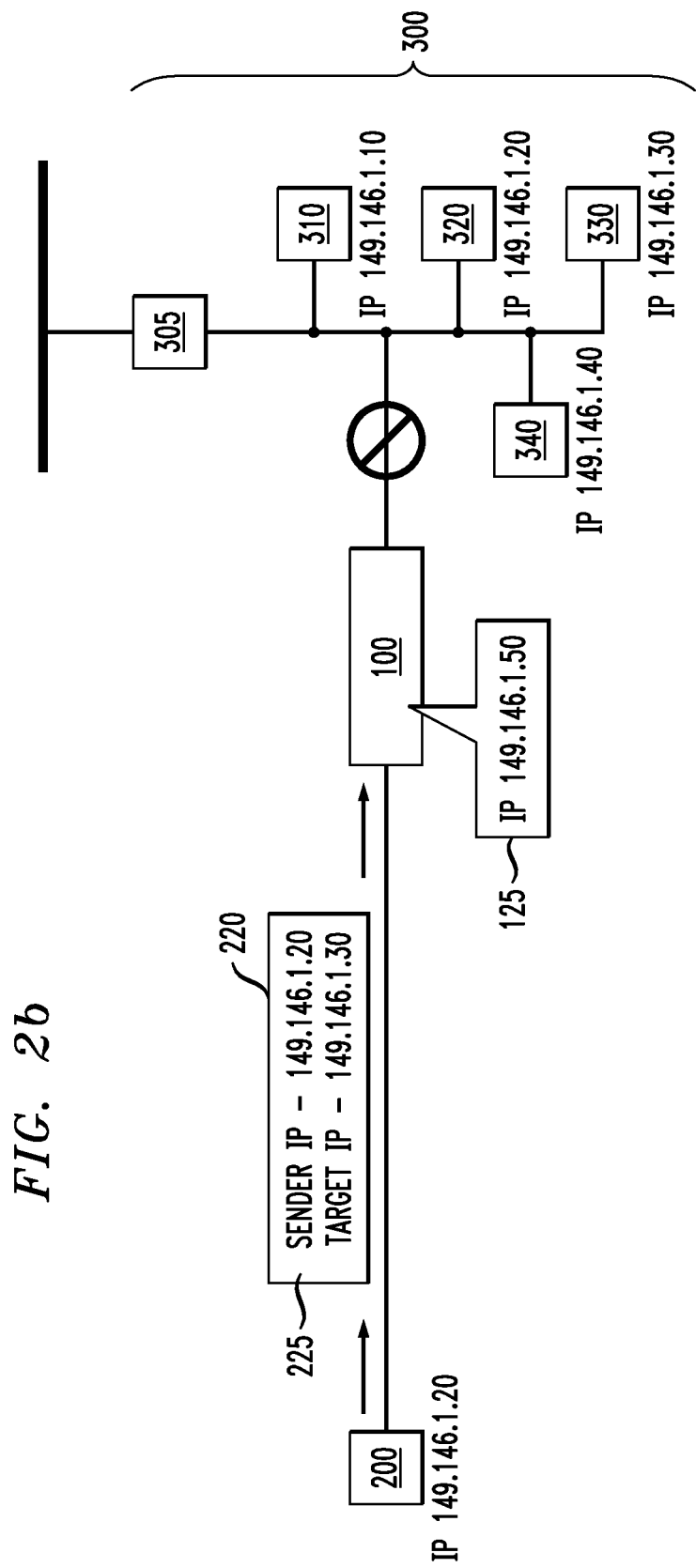

FIGS. 2a and 2b are an example, schematic diagram of a connector according to the invention by means of which a data-processing device is connected to a data-processing network that is protected by a firewall at the central connection point to another network, wherein data exchange between the device and the network is secured (FIG. 2a) or not secured (FIG. 2b) by the connector as a function of the identification of a predefined identification feature.

FIG. 1 shows a mobile connector 100 according to the invention whose connection device 110 can be connected to a data-processing device 200 and whose connection device 111 can be connected to a network 300. The connection devices 110 and 111 are constructed in this illustrated example according to the RJ-45 standard, like those required in Ethernet-based data-processing networks.

Furthermore, the connector 100 has a processing unit 120 and also a memory 140, wherein the processing unit is used, after the device 200 is connected, to first check this device for the presence of at least one predefined identification feature 125 (cf. FIGS. 2a and 2b) that is stored together with at least one authorization feature allocated to this identification feature in the memory 140, and to connect the two connection units 110 and 111 to each other and to allow data exchange between the device 200 and the network 300 according to the allocated authorization feature only after detecting at least one predefined identification feature 125, 225 according to the at least one allocated authorization feature. Thus, in a very simple embodiment, it is sufficient if the processing unit comprises merely at least one shift register and at least one comparator. The at least one shift register of the processing unit 120 is here clocked according to the clock frequency of the network 300. Furthermore, the at least one comparator is constructed to check the contents of a shift register exactly when a section of a data packet 220 that contains an identification feature as transmitter or destination information and that is transmitted by the device 200 is located in the shift register.

With increasing complexity of the identification features 125 to be checked and/or authorization features to be monitored, it is suggested to use a processor within the processing unit 120 as an addition or as an alternative to a shift register and/or a comparator.

In addition, the connector 100 has available a display device 170 that displays, on one hand, when a device 200 to be connected to the network 300 has at least one identification feature 125, 225 that has not been defined in advance and that also displays, however, on the other hand, which of the at least one predefined identification feature 125 must be assigned to the device 200 to be connected to the network 300, so that data exchange is possible.

For drawing the necessary operating voltage, the connector 100 also has available an interface 130 that is constructed in the illustrated example as a USB interface, so that the device 200 can act as a power current source via a USB cable. Alternatively, the interface 130 can also be constructed so that the operating voltage can be provided, for example, by an internal battery or an external power current source.

For configuring the connector 100, that is, for transmitting the defined identification and authorization features to the memory 140, the connector 100 is further equipped with a receive device 150 and also an input device 160 that are each connected to the memory 140. By means of the input device 160, the configuration data can be input directly at the connector 100. The receive device 150 is constructed so that it is further connected to the USB interface 130 and also to the connection devices 110, 111, so that the connector 100 can also receive configuration data from a data-processing device connected by USB cable or by network cable. In another embodiment that is different from the one described here and in which the connector 100 has available a connection device 111 for wireless connections, the connector 100 can also receive the configuration data from a data-processing device wirelessly, for example, by means of transmission techniques, such as Bluetooth or Wireless LAN.

FIGS. 2a and 2b show a connector 100 according to the invention by means of which a data-processing device 200 is connected to a data-processing network 300.

Several devices 310 to 340 that can provide different services belong to the network 300. Thus, data that are also made available to the other devices in the network 300 can be stored, e.g., on one device. The devices, services, and data are also designated below, in general, as resources.

Each of the devices 310 to 340 in the network 300 can have several different types of identification features, as an example, each IP address of each device is shown. Thus, for example, the device 310 has the IP address 149.146.1.10, the device 330 has, in contrast, 149.146.1.30 as an IP address. From the drawing it becomes clear that the IP address of each device appears only once in the network 300, so that each device can be uniquely identified and addressed.

The network 300 is further connected to another network. Because the two networks listen to different confidentiality steps, a firewall 305 that protects the network 300 and its resources from undesired accesses from the other network is installed at the central connection point between the networks, wherein the firewall checks and possibly prevents the data exchange at this point.

However, if a device like the device 200 is connected directly to the network 300 behind the firewall 305, then the firewall 305 cannot provide protection for the network 300 from dangers that can originate from this device 200.

According to the invention, however, in a simple way this protection is guaranteed by the connector 100 by means of which the device 200 is connected to the network 300.

In the illustrated example, the connector 100 is configured in such a way that the IP address 149.146.1.50 that otherwise does not appear in the network 300 forms the predefined identification feature 125. Furthermore, an authorization feature that FIGS. 2a and 2b do not show for the sake of a simpler illustration is allocated to this predefined identification feature 125, wherein, according to this authorization feature, data exchange between the device 200 and the network 300 is allowed only when the device 200 has the predefined identification feature 125.

In FIG. 2a, as an example, the case is shown in which the device 200 has the IP address 149.146.1.50, so that the connector according to its configuration grants the data exchange with the network 300.

In contrast, in the case shown in FIG. 2b, the device 200 has the IP address 149.146.1.20 that was allocated to it in another network to which it was previously connected. The device 320, however, already has this same IP address in the network 300. According to its configuration, the connector 100 now prevents any data exchange between the device 200 and the network 300 and thus the multiple appearance of the IP address 149.146.1.20 in the network 300.

In an embodiment of the connector 100 that is different from the one that is shown, it is further possible to define authorization features even more particularly and thus to guarantee in the device 200 not only the presence of unique identification features 125, 225, but instead, for the device 200, to allow data exchange with defined resources 310, ..., 340 in the network 300, wherein at least one identification feature of each resource 310, ..., 340 is also to be defined.

An even further specialization of the authorization features can be performed such that, for the device 200, only the transmission of defined commands is allowed within the data exchange, so that the transmission of an incorrect or undesired command can also be prevented.

For further simplification of the configuration of the connector 100, the identification features can be defined separately or in groups both for a device 200 to be connected to the network 300 and also for a defined resource 310, ..., 340 in the network 300, so that, for example, the information of an IP address region, instead of several individual, consecutive IP addresses, is also possible.

Finally, for a device 200 that is connected to the network 300 and that has at least one predefined identification feature 125, 225, the connector 100 can also block, at least temporarily, any further data exchange to the network 300 if it is detected repeatedly that attempts have been made by the device 200 to exchange data with at least one resource 310, ..., 340 in the network 300 or to transmit at least one defined command, wherein, however, a corresponding authorization feature is not allocated to the predefined identification feature 125.

In the network 300, it can involve as an example the network of a cell in the field of automated industrial production, through which different devices or components of a system, such as an industrial PC or field devices 310 to 340, are connected to each other.

For the case that changes to the existing network 300 are to be performed, for example, through the exchange or the addition of a device 200, the administrator of the network 300 now has the ability, with the help of the connector 100 according to the invention, to prevent in a simple way the multiple appearance of identical identification features in the network 300 after a new device 200 is connected. Furthermore, with the help of the connector 100 according to the invention, the administrator also has the ability for a new device 200 to be connected to the network 300 to limit in a simple way the access to defined devices or components 310, ..., 340 in the network 300 and also to grant the transmission of only defined commands, in order to prevent disruptions due to an inadvertent, incorrectly transmitted command.

In order to configure a connector 100 according to the invention accordingly, the administrator can define the suitable identification and authorization features by means of simple configuration software and then transmit them to the connector 100 via, for example, a USB cable. The administrator then gives these features, for example, to a service technician with the instruction to connect a service laptop 200 to the network 300 only using the connector 100.

The invention claimed is:

1. A connector (100) for providing access, for a first data-processing device (200), to a network (300) to which second and third data-processing devices are already connected, the connector (100) comprising:
   a first connection device (110) for connecting to the first data-processing device (200);
   a second connection device (111) for connecting to the network (300); and
   a processing unit (120);
   wherein the connector is mobile and is constructed for providing an individual, decentralized, and secure access to the network (300); and
   wherein the processing unit (120) is constructed, after the first data-processing device (200) is connected to the connector (100), to:
   i) check the first data-processing device for a first identification feature, wherein the check is based on reading the first identification feature from a data packet transmitted by the first data-processing device;
   ii) compare the first identification feature to a predefined, second identification feature that is suitable for unique identification of the first data-processing device (200) in the network, the unique identification being guaranteed for all data-processing devices connected to the network; and
   iii) connect the first and second connection devices (110, 111) to each other when the first identification feature matches the predefined, second identification feature, wherein the connection allows data exchange between the first data-processing device (200) and the network (300) based on an authorization feature that is allocated to the predefined, second identification feature.

2. The connector according to claim 1, wherein the processing unit (120) comprises at least one shift register and at least one comparator.

3. The connector according to claim 1, wherein the processing unit (120) comprises a processor.

4. The connector according to claim 1, wherein the processing unit (120) is further constructed to allow data exchange between the first data-processing device (200) and only one defined resource (310, ..., 340) in the network (300) based on the authorization feature allocated to the predefined, second identification feature.

5. The connector according to claim 1, wherein the processing unit (120) is further constructed to allow transmission of only a defined command within the data exchange based on the authorization feature allocated to the predefined, second identification feature.

6. The connector according to claim 1, further comprising a display device (170) for displaying the presence of the first identification feature that has not been defined in advance.

7. The connector according to claim 6, wherein the display device (170) is further constructed to display the predefined, second identification feature (125).

8. The connector according to claim 1, wherein the processing unit (120) is further constructed to block, at least temporarily, any further data exchange between the first data-processing device (200) and the network (300) in the event that the connector detects that:
   i) the first data-processing device has repeatedly attempted data exchange with a resource (310, ..., 340) in the network (300) and/or
   ii) the first data-processing device attempted transmission of a command
when a corresponding authorization feature has not been allocated to the first identification feature of the first data-processing device.

9. The connector according to claim 1, wherein the processing unit (120) is further constructed to process Media Access Control (MAC) and/or Internet Protocol (IP) addresses and/or names in the data packet transmitted by the first data-processing device as the first identification feature.

10. The connector according to claim 1, wherein the second connection device (111) is constructed for a wired or wireless connection to the network (300).

11. The connector according to claim 1, further comprising an interface (130) by means of which a required operating voltage can be provided from an internal or external current source connected directly or an external current source connected indirectly.

12. The connector according to claim 1, further comprising a memory (140) in which the predefined, second identification feature (125) and also the authorization feature allocated to the predefined, second identification feature (125) can be stored, wherein the processing unit (120) allows data exchange as a function of the authorization feature.

13. The connector according to claim 12, further comprising a receive device (150) for receiving the predefined, second identification feature and the authorization feature allocated to the predefined, second identification feature from an external device, wherein the receive device (150) can be connected to the memory (140), an interface (130), and/or the second connection device (111).

14. The connector according to claim 12, further comprising an input device (160) for inputting the predefined, second identification feature and the authorization feature allocated to the predefined, second identification features (125), wherein the input device (160) can be connected to the memory (140).

15. A method for configuring a connector comprising:
   defining a first identification feature (125) for a first data-processing device (200) to be connected to a network (300) to which second and third data-processing devices are already connected, wherein the first identification feature is suitable for uniquely identifying the first data-processing device in the network, the unique identification being guaranteed for all data-processing devices connected to the network;

allocating a defined authorization feature to the first identification feature (125); and transmitting the defined authorization feature and the first identification feature to the connector.

16. The method according to claim 15, wherein the step of allocating the defined authorization feature comprises allocation of a unique identification feature for a defined resource (310, . . . , 340) in the network (300).

17. The method according to claim 15, wherein the step of allocating the defined authorization feature comprises allocation of a defined command.

18. The method according to claim 15, wherein both the first identification feature for the first data-processing device (200) to be connected to the network (300) and also the identification feature for a defined resource (310, . . . , 340) in the network (300) are each defined separately or in groups.

19. The method according claim 15, wherein Media Access Control (MAC) and/or Internet Protocol (IP) addresses and/or names are defined as the first identification feature.

20. A method for providing access, for a first data-processing device (200), to a data-processing network (300) to which second and third data-processing devices are already connected, the method comprising:

providing a connector at according to claim 1;

connecting the connector at an arbitrary point to the data-processing network (300) and the first data-processing device (200);

reading a first identification feature (225) identifying the first data-processing device from a first data packet (220) that was transmitted from the first data-processing device (200);

comparing the first identification feature (225) that has been read with a predefined, second identification feature (125) that is suitable for uniquely identifying the first data-processing device in the data-processing network, the unique identification being guaranteed for all data-processing devices connected to the data-processing network; and when a match has been detected, granting data exchange between the first data-processing device (200) and the data-processing network (300) according to an authorization feature allocated to the predefined, second identification feature (125);

wherein an individual, decentralized, and secure access to the data-processing network (300) is provided by the controller.

21. The method according to claim 20, wherein the step of reading further comprises the reading of at least one feature identifying a defined resource (310, . . . , 340) in the data-processing network (300); and wherein the step of granting relates to granting data exchange between the first data-processing device (200) and only at least one defined resource (310, . . . , 340) in the data-processing network (300) that is defined by at least one identification feature.

22. The method according to claim 21, wherein the step of reading further comprises the reading of a defined command; and wherein the step of granting relates to granting the transmission of only at least one defined command within the data exchange.

* * * * *